United States Patent
Zinchenko et al.

(10) Patent No.: US 10,193,641 B2
(45) Date of Patent: Jan. 29, 2019

(54) METHOD AND APPARATUS FOR ESTIMATING AN EXPECTED RECEPTION QUALITY

(71) Applicant: VOLKSWAGEN AKTIENGESELLSCHAFT, Wolfsburg (DE)

(72) Inventors: Tetiana Zinchenko, Braunschweig (DE); Jan-Niklas Meier, Wolfsburg (DE); Burak Simsek, Braunschweig (DE)

(73) Assignee: Volkswagen AG, Wolfsburg (DE)

( * ) Notice: Subject to any disclaimer, the term of this patent is extended or adjusted under 35 U.S.C. 154(b) by 89 days.

(21) Appl. No.: 15/330,868

(22) PCT Filed: Apr. 2, 2015

(86) PCT No.: PCT/EP2015/057318
§ 371 (c)(1),
(2) Date: Nov. 7, 2016

(87) PCT Pub. No.: WO2015/169516
PCT Pub. Date: Nov. 12, 2015

(65) Prior Publication Data
US 2017/0250763 A1    Aug. 31, 2017

(30) Foreign Application Priority Data
May 7, 2014    (DE) .................. 10 2014 208 500

(51) Int. Cl.
*H04B 17/23*    (2015.01)
*H04W 24/00*    (2009.01)
(Continued)

(52) U.S. Cl.
CPC ........... *H04B 17/23* (2015.01); *H04B 17/373* (2015.01); *H04L 41/06* (2013.01);
(Continued)

(58) Field of Classification Search
None
See application file for complete search history.

(56) References Cited

U.S. PATENT DOCUMENTS

| | | |
|---|---|---|
| 6,097,697 A | 8/2000 | Yao et al. |
| 7,355,997 B2 | 4/2008 | Qian et al. |
| (Continued) | | |

FOREIGN PATENT DOCUMENTS

| | | |
|---|---|---|
| DE | 102009054795 A1 | 9/2010 |
| DE | 102011011487 A1 | 1/2012 |
| (Continued) | | |

OTHER PUBLICATIONS

Gietelink et al.; A probabilistic approach for validation of advanced driver assistance systems; Transportation Research Board; Nov. 1, 2004; pp. 1-18
(Continued)

*Primary Examiner* — Xavier Szewai Wong
(74) *Attorney, Agent, or Firm* — Barnes & Thornburg LLP

(57) ABSTRACT

A method and an apparatus for estimating an expected reception quality in an interval of time for car-to-X communication including a receiving device for acquiring data packets and a memory, wherein the memory stores at least one empirically determined variable for reception patterns of data packets in a first interval of time, which variable indicates or can be used to determine how high the probability is of a data packet or n data packets being successfully received in a subsequent, second interval of time, wherein the apparatus is designed so that the reception pattern is determined for a first interval of time before the interval of time and the associated probability for the interval of time is read from the memory, wherein a warning message is generated and/or a transmission parameter and/or
(Continued)

a functionality of a driver assistance function is/are changed on the basis of the probability.

10 Claims, 2 Drawing Sheets

(51) Int. Cl.
| | |
|---|---|
| *H04B 17/373* | (2015.01) |
| *H04L 12/24* | (2006.01) |
| *H04L 12/26* | (2006.01) |
| *H04L 29/08* | (2006.01) |
| *H04W 84/18* | (2009.01) |

(52) U.S. Cl.
CPC .......... *H04L 43/0829* (2013.01); *H04L 67/12* (2013.01); *H04W 24/00* (2013.01); *H04W 84/18* (2013.01)

(56) References Cited

U.S. PATENT DOCUMENTS

| | | | | |
|---|---|---|---|---|
| 2005/0143895 | A1* | 6/2005 | Kato | B60K 31/0008 701/96 |
| 2008/0295175 | A1* | 11/2008 | Ansari | H04L 63/1416 726/23 |
| 2009/0245103 | A1 | 10/2009 | Miyazaki | |
| 2010/0198459 | A1* | 8/2010 | Kosai | H04W 52/267 701/36 |
| 2011/0205943 | A1 | 8/2011 | Grimm et al. | |
| 2011/0238259 | A1* | 9/2011 | Bai | H04L 67/125 701/31.4 |
| 2012/0265995 | A1* | 10/2012 | Kherani | H04L 9/3247 713/179 |
| 2013/0003575 | A1* | 1/2013 | Konishi | H04W 74/0841 370/252 |
| 2014/0002276 | A1* | 1/2014 | Iyer | H04W 4/90 340/901 |
| 2014/0177462 | A1* | 6/2014 | Okada | H04W 24/08 370/252 |
| 2015/0023668 | A1* | 1/2015 | Spaulding | H04B 10/1129 398/106 |

FOREIGN PATENT DOCUMENTS

| | | |
|---|---|---|
| EP | 0986282 A1 | 3/2000 |
| EP | 2487665 A1 | 8/2012 |
| WO | 2009067215 A1 | 5/2009 |

OTHER PUBLICATIONS

Killat et al.; An empirical model for probability of packet reception in vehicular ad hoc networks; EURASIP Journal on Wireless Communications and Networking; Jan. 1, 2009; vol. 2009; pp. 1-12.
Search Report for German Patent Application No. 10 2014 208 500.4, dated Feb. 6, 2015.
Search Report and Written Opinion for International Patent Application No. PCT/EP2015/057318, dated Aug. 21, 2015.

* cited by examiner

METHOD AND APPARATUS FOR ESTIMATING AN EXPECTED RECEPTION QUALITY

PRIORITY CLAIM

This patent application is a U.S. National Phase of International Patent Application No. PCT/EP2015/057318, filed 2 Apr. 2015, which claims priority to German Patent Application No. 10 2014 208 500.4, filed 7 May 2014, the disclosures of which are incorporated herein by reference in their entirety.

SUMMARY

Illustrative embodiments relate to a method and a device for estimating a quality of reception to be expected in a time interval for a Car to X (C2X) communication.

BRIEF DESCRIPTION OF THE DRAWINGS

The illustrative embodiments will be explained in greater detail with reference to the drawings, in which.

DETAILED DESCRIPTION

Figure 1:
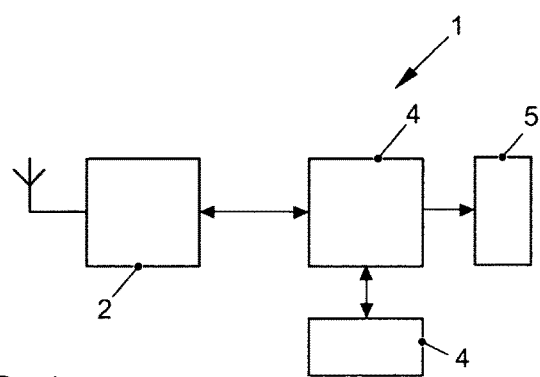
FIG. 1 shows a schematic block diagram of a device for estimating a quality of reception to be expected.

Traffic accidents and road congestions are considerable problems during a vehicle drive. Vehicle-ad-hoc-network-based systems of an active control and driver support enable a wireless short-range vehicle communication system such as, for example, a system of a dedicated short-range communication (DSRC) or a WiFi-based wireless communication system, which are known to experts, to transmit messages to other vehicles. DSRC or WiFi can be used for implementing wireless vehicle features which can improve the driver comfort and the road efficiency and provide for many types of vehicle-internal services. The DSRC technology provides a new class of vehicle features based on communication with other vehicles (Car to Car or C2C, respectively) or the infrastructure (Car to Infrastructure or C2I, resp.). In general, the term (Car to X or C2X) can be used for designating the various types of communication applications which are provided by DSRC and WiFi in vehicle environments.

From DE 20 2011 011 487 A1, a method for optimizing data which are transferred between vehicles is known. In this context, it is determined whether there are lost packets in a sequence of status messages which are transferred between two vehicles. It is determined whether a number of successful packet transfers is greater than or equal to a threshold value for successful packets and whether a datum for the received signal strength is increased if there are no lost packets in the sequence of messages. It is determined whether a number of lost packet transfers is greater than or equal to a threshold value for lost packets and whether a datum for the received signal strength is decreased if there are no lost packets in the sequence of messages. It is determined whether a number of lost packet transfers is greater than or equal to the threshold value for successful packets and when the datum of the received signal strength is increased. The length of the message packet is reduced by a predetermined extent of packet reduction if the number of lost packet transfers is greater than or equal to the threshold value for successful packets and when the datum of the received signal strength is reduced.

A similar method is known from U.S. Pat. No. 7,355,997 B2.

However, these methods only react to a deteriorated situation for reception. Especially in the case where the C2X messages are used for supporting an assistance function in a motor vehicle, the user may be surprised when the assistance function is capable of operating only to a restricted extent due to the deteriorated situation for reception.

Disclosed embodiments provide a method and create a device by means of which a quality of reception to be expected can be estimated.

The method for estimating a quality of reception to be expected in a time interval for Car to X (C2X) communication is effected by means of a memory. In the memory, at least one empirically determined variable for reception patterns of data packets in a first time interval is deposited, wherein the variable specifies or it can be determined from the variable how great the probability is that a data packet or n data packets will be received successfully in a subsequent second time interval. In this context, the reception patterns may be binary patterns which, for example, have a logical 1 for a data packet received successfully and a logical 0 for a data packet not received successfully. The length of the first time interval, of the second time interval and of the variable n are freely parameterizable in this context. However, it applies that the first time interval is longer than the second time interval. Furthermore, n is selected based on the length of the second time interval. n is then a natural number and can also be 1, therefore. The basic concept of the disclosed embodiments is that at least a certain correlation is present between a reception pattern in the first time interval and a reception pattern in the second time interval so that the first time interval allows inferences regarding the second time interval.

For this purpose, the database in the memory is determined empirically in a preliminary stage. If there is then a database which may have a variable for each or very many reception patterns, the actual method can begin. For reception patterns where there is no variable as yet it can be provided that a suitable mean value (median or arithmetic mean value) is used for the variable. Furthermore, it can be provided that the quality of reception of the pattern itself is utilized. Thus, for example, the logical 1 s are placed in relation to the number of bits of the reception pattern. A reception pattern 0100 then has a probability of reception of 25%.

If now the quality of reception for a future time interval having the length of the second time intervals is to be estimated, the reception pattern is determined for a first time interval before the future time interval. The associated probability for the time interval is then read out of the memory on the basis of the preceding reception pattern, wherein a warning message is generated based on the probability and/or a transmission parameter and/or a functionality of a driver assistance function is changed. For example, a transmitting infrastructure or a transmitting vehicle can be informed that the transmitted power is increased and/or a transmitting frequency is changed (e.g., increased) or a packet length is to be reduced. The change in the functionality of a driver assistance function can consist, for example, in that it is offered only with a restricted range of performance or not at all in the extreme case. By means of the estimation of the quality of reception to be expected, the user (driver) is informed in time of restrictions possibly to be expected because of the lack of quality of reception so that he can adjust himself correspondingly. In this context, a threshold value for the probability, during the undercutting of which a warning message is generated, can be selected based on the application.

In at least one disclosed embodiment the number of data packets received successfully and/or data packets not received successfully are acquired in the time interval, wherein the probability for the reception pattern in the memory is tracked on the basis of the acquired reception quality. I.e., the database is continuously updated and is virtually self-learning. As a result, an adaptation to changing circumstances takes place automatically, for example, when the driver after driving on roadways for a relatively long time changes to freeway driving and conversely.

In at least one disclosed embodiment, two counter readings exist for each reception pattern in the memory, wherein the one counter reading is incremented if n or more data packets have been received successfully in the time interval and the other counter reading is incremented if fewer than n data packets have been received successfully in the time interval. This represents a qualitative evaluation. For example, the time interval has a length for receiving five data packets, n being assumed to be=3. The one counter is then incremented with 3, 4 or 5 successfully received data packets. I.e., the counter readings or their relationship to one another specify the probability for whether n or more data packets are received successfully. It should be noted in this context that it is also possible to operate with a counter which is incremented and decremented as long as only overflows are observed. Alternatively, the incrementation can also take place qualitatively in that the one counter is incremented in accordance with the number of successfully received data packets in the time interval and correspondingly the other counter is incremented in accordance with the number of data packets not received successfully. It should be noted in this context that the memory or the counter reading or readings can be deleted or reset, respectively, in predetermined time intervals. The predetermined time may be freely parameterizable in this context.

In at least one disclosed embodiment, the first time interval is greater by a multiple than the second time interval which is beneficial with respect to the correlation.

In a further disclosed embodiment, a different variable of the probability is deposited in the memory for the reception patterns based on at least one parameter, wherein the associated variable or probability is selected automatically based on the parameter or the parameter is selected manually. The parameter or parameters can be, for example, environmental parameters such as city, freeway, forest areas or also weekdays which can have an influence on the reception quality. This allows an even better estimation of the quality of reception to be expected. The automatic detection of the parameter can take place, for example, by means of navigation data or data of an on-board computer.

The device for estimating a quality of reception to be expected in a time interval for C2X communication comprises a receiving device for acquiring data packets and a memory. In the memory, at least one empirically determined variable is deposited for reception patterns of data packets in a first time interval, which variable specifies or from which variable it can be determined how great the probability is that a data packet or n data packets will be received successfully in a subsequent second time interval. In this context, the device is designed in such a manner that for a first time interval before the time interval, the reception pattern is determined and the associated probability for the time interval is read out of the memory, wherein a warning message is generated based on the probability and/or a transmission parameter and/or a functionality of a driver assistance function is changed. With regard to the further beneficial embodiments of the device, reference is made to the full content of the preceding statements with regard to the method.

FIG. 1 shows a block diagram of a device 1 for estimating a quality of reception to be expected in a time interval for C2X communication which has a receiving device 2, a control unit 3, a memory 4 and a display unit 5. In this context, the receiving device 2 is typically designed as transmitting and receiving device, only the receiving device 2 being of interest here, however. The data packets 6 received and not received (see FIG. 2) are transferred to the control unit 3 where they are evaluated and made available for applications. In this context, the control unit 3 can estimate the quality of reception to be expected with the aid of the variables deposited in the memory 4 for reception pattern EM (see FIG. 2). If the estimated quality of reception then drops below a threshold value, a warning message is displayed on the display unit 5. In this context, other forms of warning such as acoustic and/or haptic are alternatively or additionally possible. Alternatively or additionally, a functionality of a driver assistance function can be changed, for example, its range of operation can be restricted.

Figure 2:
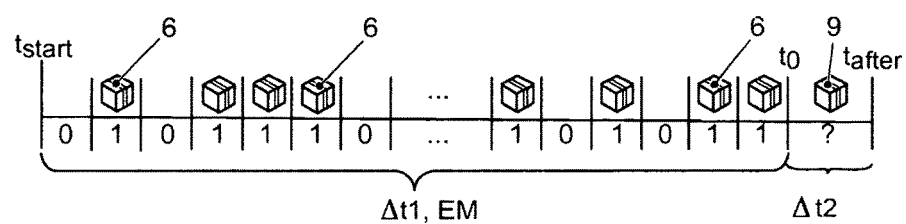
FIG. 2 shows a diagrammatic representation of a reception pattern.
Figure 3:
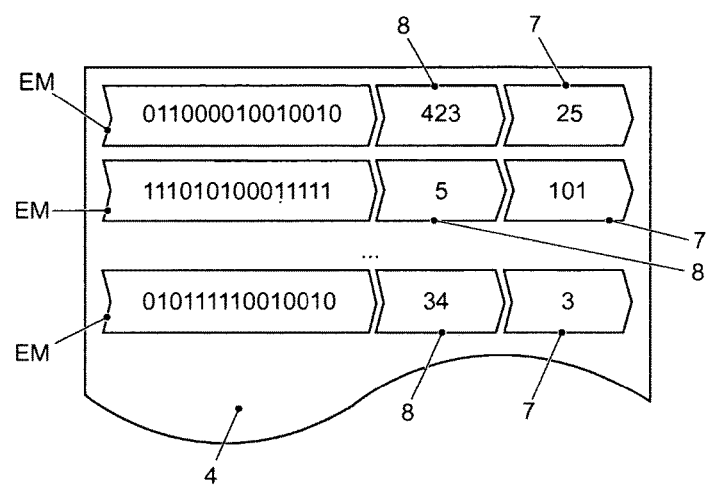
FIG. 3 shows a diagrammatic partial view of a lookup table according to a learning mode.

Initially, it is intended to explain the content of the memory in greater detail on the basis of FIGS. 2 and 3. In FIG. 2, a reception pattern EM for a first time interval $\Delta t1=t0-tstart$ is shown as it is received, for example, by the receiving device 2. Depending on the transmission frequency, the first time interval $\Delta t1$ is then subdivided into time slots and it is observed whether a data packet 6 is received in the time slot or not. The reception pattern EM is a binary pattern with a logical 1 if a data packet 6 has been received successfully and a logical 0 if a data packet 6 has not been received successfully. To illustrate, pictogram-shaped data packets 6 are shown above the logical ones. The device is now intended to estimate the quality of reception to be expected in a subsequent second time interval $\Delta t2=tafter-t0$ for data packets 9.

For this purpose, a database is first established in a learning mode, the following possibilities existing for this purpose, for example:

For each reception pattern EM in a first time interval $\Delta t1$, the data packets 9 are evaluated in the second time interval $\Delta t2$. In this context, there are two counter readings (first and second counter readings 7, 8) (see FIGS. 3 and 4), the one counter reading 7 being incremented with each data packet 9 received successfully and the other counter reading 8 being incremented with each data packet 9 not received. If, for example, the second time interval $\Delta t2$ is such a length that theoretically six data packets 9 could be received and four data packets 9 are received and two data packets 9 are not received, the one counter reading 7 is increased by four and the other counter reading 8 by two. With time, counter readings 7, 8 are then present for more and more different reception patterns EM and the counter readings 7, 8 of the reception patterns EM increase continuously until an adequate database is present. In FIG. 3, this is now shown diagrammatically for a part of the reception patterns EM which, for example, are deposited as lookup table.

In this context, the reception pattern EM "010111110010010" has a "3" for the one counter reading 7 and "34" for the other counter reading 8, i.e., that in preceding measurements with a reception pattern EM "010111110010010" in the first time interval Δt1 a total of 3 data packets 9 have been received successfully in the subsequent second time intervals Δt2 and 34 data packets 9 have not been received. By means of these counter readings 7, 8, a quality of reception to be expected in a time interval (having the length of the second time interval Δt2) can then be estimated which will be explained further later by means of FIG. 4.

Alternatively, the database can be constructed as follows. There is again a counter reading 7 for successful data packets 9 and another counter reading 8 for unsuccessful data packets 9. The difference is that it is specified in advance that in the case of n or more successful data packets 9 in the second time interval Δt2, the one counter reading 7 is incremented and in the case of fewer than n successful data packets 9, the other counter reading 8 is incremented.

Figure 4:
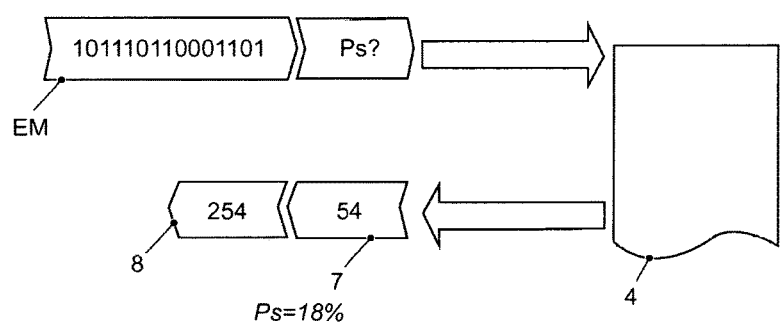
FIG. 4 shows a diagrammatic representation of the sequence for estimating a quality of reception to be expected.

FIG. 4 then diagrammatically shows the process of estimating the reception quality in a time interval, wherein in a preceding first time interval Δt1, a reception pattern EM "101110110001101" has been received. The estimated reception quality can also be expressed as (success) probability Ps. For this purpose, the counter readings 7 and 8 are read out of the memory 4 for the reception pattern. The probability Ps is then $$P_S = \frac{54}{254 + 54} = 18\%$$

in the numerical example represented.

Depending on how the counter readings have previously been formed, Ps states how great the probability is that a data packet 9 will be received successfully or how great the probability is that n data packets or more will be received successfully in the time interval ahead.

The invention claimed is:

1. A method for estimating an expected reception quality in a reception time interval for a Car to X communication by a memory, the method comprising:
   depositing at least one empirically determined variable in the memory for reception patterns of data packets in a first time interval, wherein the at least one empirically determined variable specifies or provides data to determine a probability that a data packet or a number (n) of data packets will be received successfully in a subsequent second time interval;
   determining a reception pattern for a first time interval before the reception time interval and the associated probability for the reception time interval is read out of the memory; and
   generating a change in functionality of a driver assistance function based on the probability.

2. The method of claim 1, further comprising acquiring a number of data packets received successfully and/or data packets not received successfully in the reception time interval; and
   tracking the variable or the probability for the reception pattern in the memory based on the acquired reception quality.

3. The method of claim 1, wherein a first and a second counter reading exist for each reception pattern in the memory, wherein the first counter reading is incremented in response to n or more data packets being received successfully in the time interval and the second counter reading is incremented in response to fewer than n data packets being received successfully in the time interval, or the first counter reading is incremented when in each case one data packet has been received successfully and the second counter reading is incremented when in each case one data packet has not been received successfully.

4. The method of claim 1, wherein the first time interval is selected to be greater by a multiple than the second time interval.

5. The method of claim 1, wherein a different variable or probability is deposited in the memory for the reception patterns based on at least one parameter, wherein the associated variable or probability is selected automatically in dependence on the parameter or the parameter is selected manually.

6. A device for estimating a quality of reception to be expected in a reception time interval for a Car to X communication, the device comprising:
   a receiving device for acquiring data packets and a memory, wherein at least one empirically determined variable is deposited in the memory for reception patterns of data packets in a first time interval,
   wherein the at least one empirically determined variable specifies or provides data to determine a probability that a data packet or a number (n) of data packets will be received successfully in a subsequent second time interval, wherein the device is designed so that, for the first time interval before the reception time interval, the reception pattern is determined and the associated probability for the reception time interval is read out of the memory,
   wherein a warning message is generated based on the determined probability and a functionality of a driver assistance function is changed based on the determined probability.

7. The device of claim 6, wherein the device is designed so that the number of data packets received successfully and/or data packets not received successfully is/are acquired in the reception time interval, wherein the variable or the probability for the reception pattern in the memory is tracked based on the acquired reception quality.

8. The device of claim 6, wherein the device is constructed so that a first and a second counter reading exist for each reception pattern in the memory, wherein the first counter reading is incremented in response to n or more data packets being received successfully in the reception time interval and the second counter reading is incremented in response to fewer than n data packets being received successfully in the reception time interval or the first counter reading is incremented if in each case one data packet has been received successfully and the second counter reading is incremented if in each case one data packet has not been received successfully.

9. The device of claim 6, wherein the first time interval is greater by a multiple than the reception time interval.

10. The device of claim 6, wherein a different variable or probability is deposited in the memory for the reception patterns based on at least one parameter, the device being designed so that the associated variable or probability is selected automatically based on the parameter or the parameter is selected manually.

* * * * *